United States Patent [19]

Haskins

[11] Patent Number: 4,734,679
[45] Date of Patent: Mar. 29, 1988

[54] PUSHBUTTON KEYBOARD ASSEMBLY

[75] Inventor: Steven W. Haskins, Mt. Juliet, Tenn.

[73] Assignee: Northern Telecom Limited, Montreal, Canada

[21] Appl. No.: 873,723

[22] Filed: Jun. 12, 1986

[51] Int. Cl.$^4$ .............................................. H04L 1/00
[52] U.S. Cl. .................. 340/365 R; 379/368; 379/369; 379/451
[58] Field of Search ............ 340/365 R, 365 C, 365 S, 340/365 VL; 179/90 K, 178, 184; 200/5 R, 5 A; 361/395; 379/368, 369, 451

[56] References Cited

U.S. PATENT DOCUMENTS

| | | | |
|---|---|---|---|
| 3,725,907 | 4/1973 | Boulanger | 179/90 K |
| 4,243,846 | 1/1981 | Lenaerts et al. | 340/365 S |
| 4,355,211 | 10/1982 | Steiner | 340/365 VL |
| 4,436,965 | 3/1984 | Morse | 179/184 |
| 4,501,938 | 2/1985 | Kawauchi | 200/5 A |
| 4,508,942 | 4/1985 | Inaba | 200/5 A |
| 4,551,919 | 11/1985 | Dreher | 340/365 VL |
| 4,555,600 | 11/1985 | Morse | 179/178 |
| 4,568,918 | 2/1986 | Edel | 200/5 A |
| 4,570,039 | 2/1986 | Osawa et al. | 200/5 A |

OTHER PUBLICATIONS

C. C. Kling—"Plastic Keyboard Translator"—IBM Technical Disclosure Bulletin—vol. 4, No. 12, May 1962—pp. 3–4.

Primary Examiner—Gerald L. Brigance
Assistant Examiner—Mahmoud Fatahi-yar
Attorney, Agent, or Firm—Schwartz, Jeffery, Schwaab, Mack, Blumenthal & Evans

[57] ABSTRACT

A pushbutton keyboard assembly has a plurality of pushbuttons mounted over a circuit board. A circuit pattern on the circuit board has a plurality of switch positions and a pushbutton is aligned with each switch position. A cap fits over each pushbutton, each cap having a clear top for viewing of an indicia printed on the top of the pushbutton. Each cap has a laterally extending flange by which it is held in position by a dial cover extending over the circuit board and having apertures for the pushbuttons and caps. By the provision of caps, the indicia can be printed using material having suitable characteristics matching the pushbutton material, without the need of also withstanding wear during use.

6 Claims, 4 Drawing Figures

PUSHBUTTON KEYBOARD ASSEMBLY

This invention relates to a pushbutton keyboard assembly such as is used, for example, in telephones and other telecommunications terminals.

In many forms of keyboards, such as telephone dials and other forms of terminals, pushbuttons actuate switches, the contacting member actuated by the pushbutton comprising an elastomeric member or pad having molded button members thereon, with a conductive protrusion below each pushbutton. The pushbutton members are molded as part of the elastomeric member, being joined thereto by a thin flexible annular rim or flange. The conductive protrusions are positioned in recesses and are pushed down into contact with the conductors at switch positions on a circuit board. Normally a conductive protrusion acts to interconnect conductors on the circuit board.

It is a constant requirement that the cost of assembly, and parts of assemblies, used in telephones and other similar apparatus be kept to a minimum. At the same time, particularly in telephone sets, there is a customer demand for color selections and variations in appearance. However, a problem arises in that there is a limited selection of colors which can be used for the button members. It is necessary to define on the top surface of each button member, one or more indicia, such as numbers, letters and other indicia. These indicia are normally formed by printing on a rubber ink which bonds or diffuses into the button member. The inks available are limited in color selection. The ink must not wear off under constant application of a user's finger to a button. Also, to widen the choice of color for the pushbutton, colored plastic covers are used, printed with indicia. Here again, there is a limitation in inks available which diffuse into the plastic and withstand use.

The invention provides the ability to print or otherwise form the indicia on buttons, in any color desired, by any ink which will deposit on the button. After defining the indicia, the button is covered by a transparent cap which protects the button and its indicia but enables the indicia to be seen. The caps can be molded easily at a very low cost. Some of the cost can be offset in that less expensive inks can be used, if desired.

The invention will be readily understood by the following description of various embodiments, by way of example, in conjunction with the accompanying drawings, in which.

Figure 1:
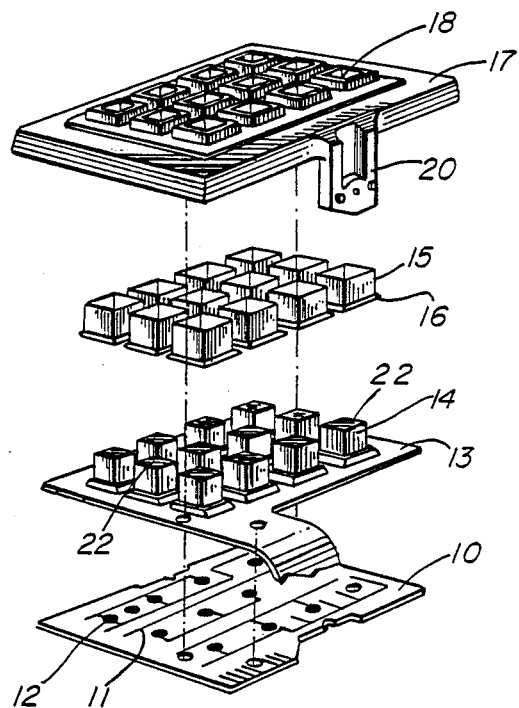
FIG. 1 is an exploded perspective view of one form of pushbutton or keyboard assembly, in accordance with the invention.

As illustrated in FIG. 1, a telephone pushbutton dial assembly comprises a circuit board 10 having on an upper surface a circuit pattern indicated at 11. The circuit pattern includes a plurality of switch positions 12. Over the circuit board 10 extends an elastomeric member 13 having a plurality of pushbuttons 14 formed on an upper surface. As will be described in relation to FIG. 4, there is a protrusion below each pushbutton, each protrusion aligned with a switch position 12. The protrusions are of conductive material, or at least have a conductive surface. Fitting over each pushbutton is a clear plastic cap 15. Each cap is of hollow box form and has a small outwardly extending flange 16 extending around its periphery at its lower, open, end. Over the buttons 14 and the caps 15 is positioned a dial cover 17 having a plurality of apertures 18, an aperture aligned with each pushbutton 15. The dial cover is supported in a telephone by brackets, one bracket indicated at 20. The circuit board 10, elastomeric member 13 with buttons 14 and caps 15 are assembled to the cover 17, the pushbuttons, and caps, extending through the apertures 18. The flanges 16 rest against the lower surface of the dial cover in an unactuated condition.

On the top surface 21 of each pushbutton 14 is an indicia 22. This is formed by printing, as by screen printing, with an ink of contrasting color. The ink is protected by the caps 15 and thus is not worn off nor becomes obscured by dirt.

Figure 2:
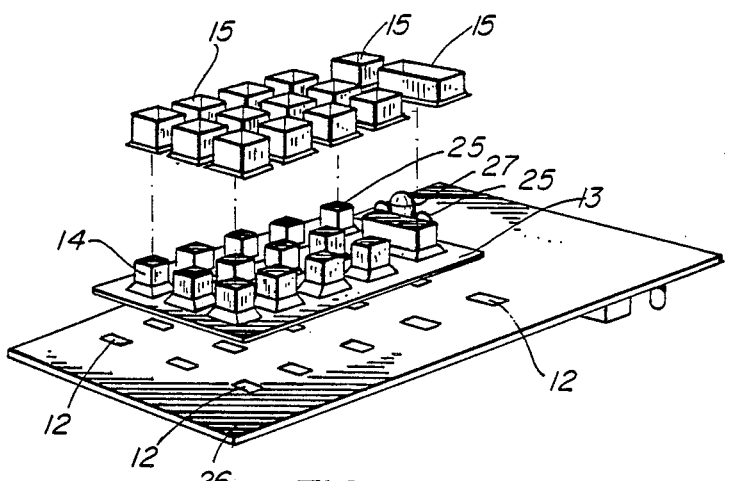
FIG. 2 is an exploded perspective view of another pushbutton or keyboard assembly.

FIG. 2 illustrates a keyboard which, in addition to a plurality of pushbuttons 14, has, in the example, two additional pushbuttons or keys 25. These can be for special features. As in the arrangement of FIG. 1, an elastomeric member 13 has the pushbuttons 14 formed thereon, plus the buttons or keys 25. The elastomeric member rests on a circuit board 26 having switch positions 12. The circuit board can also have contact positions, not seen, which make contact with an indicator such as a light emitting diode or other light emitting device indicated at 27. Transparent caps 15 fit over the pushbuttons 14 and keys 25. In the example, the dial cover is not shown.

Figure 3:
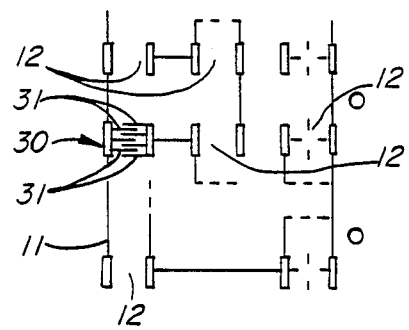
FIG. 3 is a plan view on part of a switch circuit pattern.

FIG. 3 illustrates part of a circuit board, showing a particular circuit pattern 11 with switch positions 12. At 30, one particular switch position is shown in detail, comprising two sets of interleaved conductors 31. When a pushbutton is depressed, the conductive protrusion interconnects the interleaved conductors 31.

Figure 4:
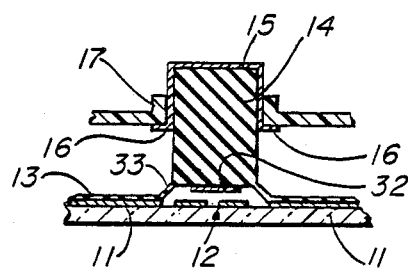
FIG. 4 is a cross-section through a single pushbutton with circuit board and bezel or dial cover illustrated.

FIG. 4 is a cross-section through a pushbutton or key 14. The cap 15 is shown and the narrow flange 16 which is against the undersurface of the dial cover or bezel 17. The circuit board is indicated at 10 and the elastomeric member at 13. In FIG. 4 is seen the protrusion, below the pushbutton, at 32. This protrusion is either of conductive material or has a surface which is conductive. The circuit pattern is seen at 11 and the switch position at 12. The pushbutton and the protrusion 32 are connected to the elastomeric member 13 by an annular web 33, of frusto-conical form. Web 33 resiliently urges the pushbutton 14, and protrusion 32, away from the switch position 12.

Depending upon the particular keyboard, the shape of the pushbuttons or keys, and the number and arrangement of such pushbuttons or keys, can vary. Also, with the use of clear plastic caps, it is possible to color one, or more, of the pushbuttons by spraying or coating with a color different from other pushbuttons. This can be used to indicate a particular service, or services. Any convenient coloring material can be used as it will be protected by the plastic cap. A further possibility is the ability to use paper, or other material, on the top surface of a pushbutton. The paper will be protected by the plastic. This can be particularly useful for pushbuttons used for service related uses. The particular use, or function, associated with a pushbutton may vary from keyboard to keyboard and this can be met with paper or similar overlays positioned on a pushbutton prior to attachment of the plastic cap.

What is claimed is:

1. A pushbutton keyboard assembly comprising:
   a circuit board having a circuit pattern on an upper surface, said circuit pattern including a plurality of switch positions;
   a switch associated with each switch position;
   a pushbutton positioned over each switch position and moveable for actuation of said switch, each pushbutton having a top surface and a peripheral wall extending down from said top surface;
   a cap positioned directly over each pushbutton, each cap having a clear top wall and a peripheral wall extending down from said top wall to a bottom edge, said peripheral wall of each cap substantially surrounding said peripheral wall of each pushbutton so that each cap is closely fitted over a pushbutton, and an outwardly extending flange at said bottom edge, each cap being free of permanent connection to any pushbutton and other caps;
   a dial cover extending over the circuit board and including a plurality of apertures, and aperture for each pushbutton and cap, the outwardly extending flange on each cap being in contact with an undersurface of the dial cover when the pushbutton is in an unactuated position; and
   indicia formed on the top surface of each pushbutton and visible through the top wall of the related cap.

2. A keyboard assembly as claimed in claim 1, including an elastomeric member extending over said circuit board, said pushbuttons formed on an upper surface of said elastomeric member, a plurality of protrusions on a lower surface of said elastomeric member, a protrusion aligned with each said switch position, each protrusion having at least a conductive bottom surface to form a said switch, said protrusions resiliently urged away from said switch positions;
   whereby pressure on a cap depresses a pushbutton and moves a protrusion into contact with said circuit pattern on the circuit board to cause a switching action.

3. A keyboard assembly as claimed in claim 2, each said caps being of a transparent material.

4. A keyboard assembly as claimed in claim 2, including an annular web extending between each pushbutton and said elastomeric member, said annular webs acting to resiliently urge said pushbuttons away from said switch positions.

5. A keyboard assembly as claimed in claim 1, each said outwardly extending flange extending for the whole periphery of the related cap.

6. A keyboard assembly as claimed in claim 1, said pushbuttons comprising a first series arranged in columns and rows and at least one further pushbutton positioned separately from said columns and rows.

* * * * *